United States Patent [19]
Bezencon, deceased et al.

[11] 4,347,918
[45] Sep. 7, 1982

[54] DRIVE DEVICE FOR A VEHICLE

[75] Inventors: Jean-Jacques Bezencon, deceased, late of Bernex, Switzerland, by Madeleine Bezencon, Corinne Bezencon and Serge Bezencon, heirs; Georges Menzi, Le Lignon, Switzerland; Lucien Mermoud, Geneva, Switzerland

[73] Assignee: BBC Brown, Boveri & Co. Ltd., Baden, Switzerland

[21] Appl. No.: 120,519

[22] Filed: Feb. 11, 1980

[30] Foreign Application Priority Data

Feb. 22, 1979 [CH] Switzerland ............ 1176/79

[51] Int. Cl.³ .............................................. B60K 41/02
[52] U.S. Cl. ............................. 192/0.02 R; 192/0.032; 192/0.076; 192/3.32; 74/866
[58] Field of Search ............ 192/0.02 R, 0.032, 0.034, 192/103 R, 0.073, 0.075, 0.076, 0.092, 3.57, 3.32, 3.58; 74/866, 877, 688, 687, 730, 731, 733

[56] References Cited

U.S. PATENT DOCUMENTS

| | | | |
|---|---|---|---|
| 3,805,640 | 4/1974 | Schneider et al. | 74/866 X |
| 3,857,302 | 12/1974 | Morris | 192/3.3 X |
| 3,984,742 | 10/1976 | Bader | 74/866 X |
| 4,021,712 | 5/1977 | Ishihara et al. | 192/0.02 R |
| 4,231,092 | 10/1980 | Grob et al. | 74/866 X |

*Primary Examiner*—George H. Krizmanich
*Attorney, Agent, or Firm*—Werner W. Kleeman

[57] ABSTRACT

Particularly in the case of electric motor vehicle drives using an hydrodynamic torque converter or appropriate coupling there is present the problem of proper and reliable operation of the vehicle condition control through the use of comparatively modest expenditure in equipment. This problem is solved by using a torque regulation with a torque control magnitude which is variable in accordance with controlled vehicle condition commands or an appropriate reference or set value, preferably through the use of a degree of filling control of the converter or the coupling as the positioning or adjusting element. When there is used an electric collector motor as the drive there is advantageously accomplished as a function of a threshold value of the degree of filling a change-over to an electrical field control.

25 Claims, 2 Drawing Figures

DRIVE DEVICE FOR A VEHICLE

BACKGROUND OF THE INVENTION

The present invention relates to a drive device for a vehicle, particularly a road or rail vehicle.

Generally speaking, the drive device for a vehicle is of the type comprising at least one drive motor and a transmission unit arranged after the motor and which is provided with an hydrodynamic clutch and/or an hydrodynamic torque converter. Such a drive device is known from German Offenlegungsschrift No. 2,618,073. Such patent discloses that an electric drive motor is connected via a hydrodynamic transmission, containing a torque converter and a clutch, to the drive wheels, the converter and the clutch being alternately switched into the power transmission system in dependence on the particular travelling speed.

Drive devices of the aforementioned type offer an alternative to the known electric-motor drives, the speed or torque of which is controlled by acting on the supply voltage or on the armature current with the aid of a high-power electronic switching device, for example, in direct current motors, a chopper, the switching conditions of which can be controlled, or, in the case of three-phase motors, a converter or current inverter which can be controlled in its output amplitude and frequency. The present alternative renders unnecessary such a high-power electronic system with its still considerable expenditure, and also its susceptibility to malfunction when used with the different types of current rectifiers. Thus the electro-hydraulic drive system continues to be viable and to have prospects for development.

SUMMARY OF THE INVENTION

It is an important object of the present invention to develop such a drive system further in the direction of improved operability and adaptability with respect to changing traffic situations under which the vehicle drive system must operate and, particularly, to avoiding automatically excessive mechanical and electrical loads during start-up and when travelling on inclines.

In a drive device of the type mentioned initially, this object is achieved, according to the invention, by a torque control device comprising a control-variable transmitter which can be controlled in dependence upon a driving condition command and which is connected to a set-value input of a subsequently arranged set value/actual value comparator. The torque control system provided in accordance with the invention, with its control-variable transmitter which can be controlled by the driver of the vehicle in accordance with the traffic conditions, makes it possible to sensitively and surely meter the drive power and thus also the acceleration of the vehicle from standstill or from low speeds, and as the speed increases the components of the running resistance, which increase as a function of speed, provide for a gradual reduction in the power available for acceleration and thus for a soft transition into the stationary running condition at higher speeds. Above all, however, the torque control system provides for a safe limiting of the loads occurring in the drive, on the one hand, and, on the other hand, for a complete utilisation of the predetermined load limits with a fully-driven control-variable transmitter.

Further developments of the invention contemplate using a capacity control system for the hydrodynamic torque converter or a corresponding clutch, or a speed-control or torque-control system for the drive motor as a regulating unit for the torque control system. Using the torque converter or the clutch with capacity control as a regulating unit is particularly advantageous for the range of conditions between standstill and low vehicle speeds, whereas acting on the speed or torque of the drive motor is appropriate for the higher ranges of travelling speed with comparatively slight changes in speeds. It is particularly advantageous to have a combination of both types of regulating units and to activate them alternately, preferably in dependence on reaching a predetermined capacity of the converter or clutch. This makes it possible to limit the operation of the converter or clutch, which is associated with slip and thus with power losses, automatically, to comparatively short-term ranges of travelling conditions with correspondingly gentle loading on the drive motor, on the one hand, and to operate with drive motor control, for the greater proportion of time, on average, and with correspondingly better efficiency at higher travelling speeds, on the other hand. Above all, but not exclusively, these aspects apply to the use of an electric drive motor, preferably a commutator motor, the controllable excitation system of which can be used particularly advantageously as a regulating unit for the torque control system. Such an excitation control system needs to handle only comparatively little power and a small power stroke and can, therefore, be executed with comparatively little expenditure and makes it possible to have an uncontrolled armature-current supply with correspondingly little circuitry.

BRIEF DESCRIPTION OF THE DRAWINGS

Further characterising features and advantages of the invention are explained with the aid of the illustrative embodiment shown diagrammatically in the drawings, in which.

DETAILED DESCRIPTION OF THE PREFERRED EMBODIMENTS

Figure 1:
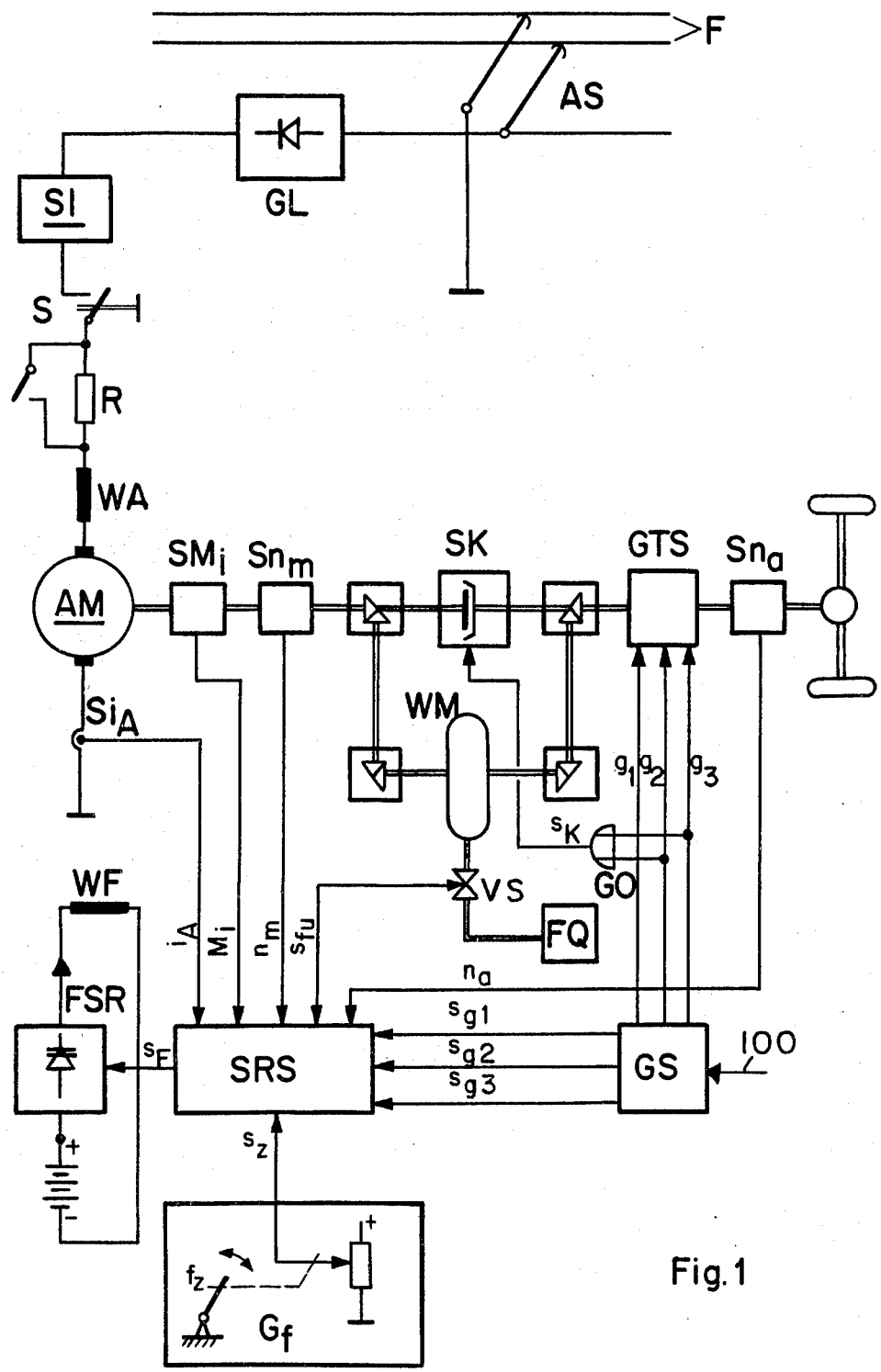
FIG. 1 shows the functional block diagram of an electric-hydraulic vehicle drive.

The example shown represents a drive system for a trolley-bus, comprising a two-wire contact line F and corresponding current collectors AS, followed by a rectifier GL for the assumed case of alternating-current contact line supply, and followed by the commutator drive motor AM. The armature circuit is provided with customary auxiliary switching devices, not shown in detail, for example a fusing and protection circuit SI, indicated diagrammatically, a main switch S and a series resistance R which can be short-circuited for the coarse switching of the armature current. Moreover this is an uncontrolled armature-current supply in which the uncontrolled rectifier GL, in the case of a direct-current contact-line supply can also be omitted, and which is of correspondingly simple construction.

The motor AM is connected to a torque-measuring section or element $SM_1$ and a motor speed-measuring section or element $Sn_m$ and to an armature current-measuring section $Si_A$, the measuring signals of which, comprised of an actual torque value signal $M_i$, an actual motor speed value signal $n_m$ and an actual armature-current value signal $i_A$, together with a driving condition control variable or magnitude $s_z$, are supplied to a central control and regulating circuit SRS. In a manner which is still to be explained, the latter takes over the function of torque control and other control and regulating functions for the drive. The driving condition control variable $s_z$ is supplied by a control-variable or control magnitude transmitter $G_f$ which, in turn, contains a control element, such as a driving pedal or the like, which can be adjusted by the driver of the vehicle in accordance with a driving condition command $f_z$ which can be adjusted deliberately, and this control element acts in the manner shown diagrammatically on an electric signal transmitter, for example in the form of a potentiometer or of a transmitter of the angle of rotation. Such devices are generally known and do not need to be explained in greater detail at this place.

The motor AM is followed in the drive path by an hydrodynamic torque converter WM having a mechanical bridging transmission. The expression "hydrodynamic torque converter" is used in its broader sense to also encompass an hydrodynamic clutch. The latter has a fixed transmission ratio and is constructed in the example under discussion as a gear-changing clutch SK, that is to say, it can be switched over by means of a corresponding switching signal $s_K$ between the rigid transmission ratio, which disables the torque converter WM and its slip, and the free-wheeling mode with the torque converter in action. There is further arranged in the drive path a mechanical gear-changing mechanism GTS which can be switched over by means of corresponding switching signals $g_1$, $g_2$, $g_3$, in the case of the example, between three fixed gear stages with different transmission ratios. The control signals $s_{g1}$, $s_{g2}$, $s_{g3}$, corresponding to these gear stages, together with an actual output speed value signal $n_a$ from a corresponding measuring section $Sn_a$ following the gear-changing mechanism GTS, are fed to the control and regulating circuit SRS. In the case of the example, the clutch-switching signal $s_K$ is derived by an OR-gate GO from the switching signals $g_2$ and $g_3$ so that, therefore, the converter WM is always bridged when the second and third gear stages of the gear-changing mechanism GTS are engaged. The switching signals $g_1$, $g_2$ and $g_3$ and the corresponding control signals $s_{g1}$, $s_{g2}$ and $s_{g3}$ are supplied by a switching control device GS, for example in dependence on the travelling speed or other driving condition variables, which can be appropriately inputted to the switching control device, as generally indicated by reference character 100. Such control systems of gear-changing mechanisms for vehicles are also generally known in themselves and do not need to be explained in greater detail at this place.

As regulating units for the torque control system two devices are provided which can be activated alternatively, if necessary with a mutual overlap in time of the corresponding active states, which are, on the one hand, a capacity-control system for the torque converter WM and, on the other hand, an excitation-control system for the commutator motor AM. For the capacity control system a filling source FQ is provided which has a control valve VS which is actuated by means of a capacity control signal $s_{fu}$ from the control and regulating circuit SRS. For the field-control of the motor a field winding WF for separate excitation is provided which is fed via a field-current rectifier FSR from an independent power source, for example a storage battery, in dependence on a field control signal $s_F$ for the purposes of the torque control and other regulating and control functions. In addition, the commutator motor is constructed as a compound motor and, accordingly, has an additional armature-current field winding WA in the customary manner.

Figure 2:
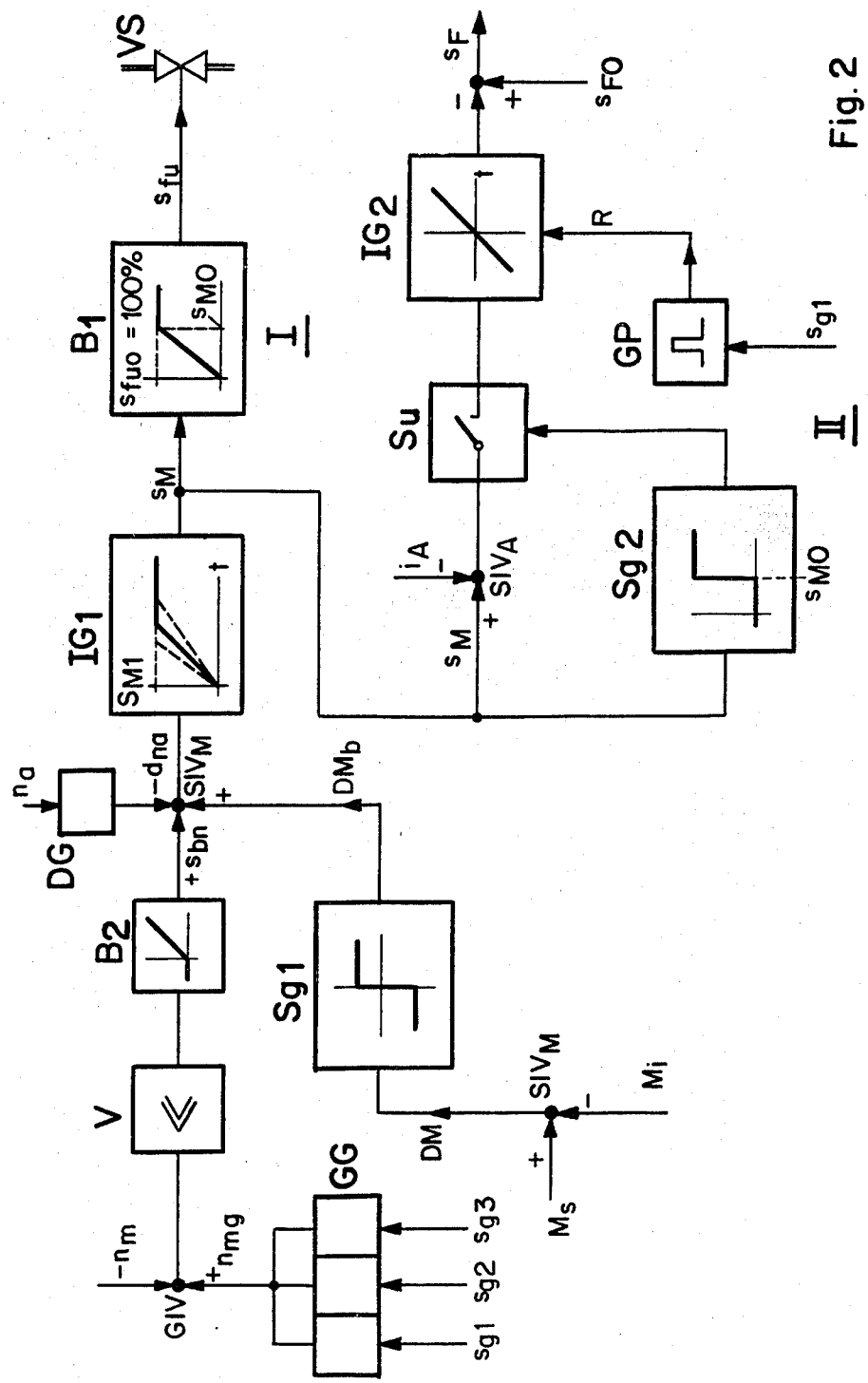
FIG. 2 shows the functional block diagram of a torque control device for the vehicle drive according to FIG. 1.

Now the construction and operation of the torque control device, which is essentially contained in the circuit unit SRS, is explained with the aid of FIG. 2.

The input element of the control device is a set torque value/actual torque value comparator $SIV_M$ which produces a difference DM between the set or reference and actual torque values as a deviation signal from the above-mentioned signals $s_z$ and $M_i$. In this process the driving condition control variable $s_z$ acts as the set torque value signal $M_s$. Basically, the signal DM can be converted in its present form into a regulating variable for the torque control system, for example via a subsequent integral section $IG_1$, which converts the torque control system to one which contains integral components of the transition process. In the practical driving of the vehicle this has the advantage that, even if the driving condition command is rapidly driven to its full limit, the active torque increases only gradually, thus avoiding strong and jolting loads on the drive and also corresponding loads on the passengers. In addition, this integral section, as shown diagrammatically in the diagrammatic curve inside the circuit block of $IG_1$, is provided with an output limiting system of the usual type, which prevents overloading due to forces of acceleration and also overloading in the electrical range of the drive system.

In the case of the example, the torque control system is not constructed as a simple integral control system but as a two-step control system, by means of a limit value switch $S_{g1}$ which follows the set/actual value comparator $SIV_M$, in the manner of a discontinuous control system. This, therefore, produces a binary or limited deviation system $DM_b$ which is fed to the following integral section $IG_1$ and thus causes the integration to be enabled in the increasing or decreasing direction of the output signal, depending on the sign of $DM_b$, at a fixed rate of change.

In the case of the example, certain control and regulating functions, which are a function of the motor or output speed of the drive system, are subordinated to the torque control system with the aid of additional functional elements preceding the integral section $IG_1$. These additional functions will be passed over just now and will be explained in greater detail further below, after first dealing with the torque control system including its regulating units.

As has been mentioned already in general, in the case of the example a transition is provided in the area of the regulating units of the control system between the capacity-control of the hydrodynamic converter WM, on the one hand and the excitation-control system of the commutator motor AM, on the other hand. Accordingly, the torque-regulating signal $s_M$, obtained at the output of $IG_1$ is fed in parallel to two control channels I and II.

The first-mentioned channel comprises a limiter $B_1$ which at its output supplies the capacity-control signal $s_{fu}$, already mentioned in reference to FIG. 1, for the control valve VS. This capacity-control signal is limited, in accordance with the curve shown diagrammatically in the circuit block of $B_1$, to a limit value $s_{fuO}$, for example corresponding to a capacity of 100% with an associated limit value $s_{MO}$ of the torque regulating signal.

In the control channel II the torque regulating signal $s_M$ is fed to a limit value switch $S_{g2}$, apart from a set/actual value comparator $SIV_A$ used for additional armature-current control. This limit value switch generates, only above a predetermined limit value which, in the case of the example, is set to equal the limit value $s_{MO}$ in the limiter $B_1$, in accordance with the curve shown diagrammatically in the circuit block, an output signal for closing a subsequent switch $S_u$, which switch here acts in the sense of a change-over switch for activating the excitation control system as an alternative regulating unit for the torque control system. If the settings of the limit values in $B_1$ and $S_{g2}$ agree with each other and the characteristic of $B_1$ is adjusted to a limit value $S_{fuO}=100\%$, the two regulating units will take over from each other in the transition area smoothly. If necessary, in the interests of a gentle transition between the two operating conditions an overlap can also be achieved by setting the limit in $s_{g2}$ to a lower value.

In the control channel II now a further integral section $IG_2$ follows which has a reset input R and is associated with a reset pulse transmitter GP, which in the case of the example, is activated in each case when the first gear stage of the gear-changing mechanism GTS is engaged and brings the field control signal $S_F$, generated by this integration, to a quiescent value $s_{FO}$ which is input by means of a summing section. The resultant field-control signal acts, in a customary manner, on the field-current rectifier FSR in the direction of increasing the torque and the counterelectromotive force, that is to say in the direction of reducing the armature current in the commutator motor AM.

When starting the vehicle up from standstill or from low speed ranges, initially the first gear stage of the gear-changing mechanism GTS is selected by the switching signal $g_1$ being activated by the control device GS. When increasing the speed with increasing torque regulating signal $s_M$, in response to the effect of the integral section $IG_1$, the system initially passes through the rising section of the curve of the limiter $B_1$ with a corresponding increase in the filling of the torque converter WM. When the predetermined capacity or the limit value $s_{MO}$ has been reached, the switch $S_u$ closes and thus increasingly activates the field-control system of the commutator motor as regulating unit, via the integral section $IG_2$. During this process the output of the reset pulse transmitter GP is ineffective, despite the control signal $s_{g1}$ being present, and has no effect on the reset input R of this integral section. For example, when a predetermined travelling speed or output speed $n_a$ has been reached, the second gear stage of GTS is engaged by GS via $g_2$, simultaneously rendering ineffective the converter by activating $s_K$ and engaging the gear-changing clutch SK in the bridging transmission. This also eliminates the power losses in the converter or in a corresponding hydrodynamic clutch due to slippage for the corresponding range of travelling speeds, and the efficiency correspondingly. The same applies to the third gear stage of the gear-changing mechanism GTS because of the OR-gate GO. Only upon switching back to the first gear stage is the integral section $IG_2$ reset via GP and R, in the case of the example, therefore, in dependence on the output speed $n_a$. If necessary, this resetting can also be achieved by making it a function of the motor speed $n_m$ by means of control means which in themselves are obvious.

Providing the advantage of an effective overload protection for the electric drive motor and, in general, an increased protection against failure of the whole control loop, an armature-current control system incorporating the aforementioned set/actual value comparator $SIV_A$ is in the case of the example subordinated to the torque control system. To this end this comparator is fed with the aforementioned actual armature-current value signal $i_A$ from the associated measuring section $SI_A$.

In addition, in conjunction with the torque control system and the subordinate armature control a subordinate vehicle acceleration control system is provided which, above all, is active for positive or negative components of acceleration such as occur markedly under certain circumstances when travelling on inclines, particularly in road vehicles, and which are more or less independent of the motor torque. This subordinate acceleration control system contributes materially to facilitating operation and to the travelling comfort.

In the case of the example, the subordinate acceleration control is introduced by means of its own set/actual value comparator $SIV_n$ in which the aforementioned difference signal $DM_b$ and, if necessary, an additional adjustable set-value or control-variable component, not shown, and, additionally, as an actual auxiliary control-variable signal, the temporal differential quotient $dn_a$ are superimposed on the output speed $n_a$ with opposite signals. This temporal deviation of the output speed is formed by means of a differentiating section DG. The resulting difference signal arising at the output, not designated in detail, is fed directly to the integral section $IG_1$, that is to say it is integrated up (up to the aforementioned output limiting of the integral section) in time with its values which differ according to the driving situation, and thus cause a variation with time in the slope of the start-up characteristic of the regulator, namely in the sense of a feedback with respect to any deviations from the normal start-up process, predetermined by the limit value switch $S_{g1}$, with a fixed rise in time of the torque regulating signal $s_M$.

In addition, a drive motor speed-limiting system is also subordinated to the torque control system and also uses the set/actual value comparator $SIV_n$. This speed-limiting system comprises a limit value transmitter GG, which is provided with different stages, which can be activated by the switching stage control signals $s_{g1}$, $s_{g2}$, $s_{g3}$, with different values of a motor speed limit value signal $n_{mg}$, not illustrated in greater detail here. The latter is compared with the motor speed $n_m$ in an actual limit value comparator GIV. The difference signal obtained in this manner is fed via an amplifier V with a comparatively high amplification factor and via a limiter $B_2$, which blocks negative difference values, in the form of a speed-limiting signal $s_{bn}$ to the comparator $SIV_n$. Due to the high amplification factor the last-mentioned signal will predominate at the comparator $SIV_n$ in comparison with the other signal components to such an extent that when the corresponding speed limit is exceeded the motor speed is effectively limited via the appropriate active regulating unit. Thus the drive motor is effectively held within the range of speeds admissible for safety reasons in each of the different gear stages of the gear-changing mechanism.

Finally, it is noted that, if necessary, instead of a controllable separate excitation system of the electric drive motor, a controllable shunt excitation system can be used, which under certain circumstances enables the constructional expenditure to be reduced. The field-current rectifier, represented in FIG. 1, is replaced, for example, by a controllable shunt chopper for the associated shunt-field winding. In each case the essential advantage with respect to an armature-current control by means of high-power electronics is that only the comparatively low excitation power has to be controlled.

While there are shown and described present preferred embodiments of the invention, it is to be distinctly understood that the invention is not limited thereto, but may be otherwise variously embodied and practiced within the scope of the following claims. Accordingly,

We claim:

1. A drive device for a vehicle, particularly a road or rail vehicle, comprising at least one controllable drive motor and a transmission unit operatively arranged after and coacting with said drive motor, said transmission unit containing an hydrodynamic torque converter, a torque control device operatively connected with said hydrodynamic torque converter, said torque control device comprising a control-variable transmitter controlled in dependence upon a driving condition command, a set-value/actual-value torque comparator with which there is connected said control-variable transmitter, said hydrodynamic torque converter being arranged in circuit after said torque control device and constituting a regulating unit for regulation of the motor torque.

2. Device according to claim 1, characterised in that said hydrodynamic torque converter has capacity control means.

3. Device according to claim 2, characterised in that a drive motor control is provided which follows the torque control device as a regulating unit.

4. Device according to claim 3, characterised in that as the drive motor an electric commutator motor with controllable excitation is provided as regulating unit for the torque control.

5. Device according to claim 4, characterised in that the commutator motor is provided with a combination of separate and armature excitation and controllable separate excitation as a regulating unit for the torque control.

6. Device according to claim 4 or 5, characterised in that an uncontrolled armature-current supply is provided for the commutator motor.

7. Device according to claim 3, characterised in that the torque control device is provided with switching means for the transition between the capacity control means of the hydrodynamic torque converter and the drive motor control, said switching means constituting regulating units which can be activated alternately for the torque control.

8. Device according to claim 3, characterised in that the torque control device is provided with switching means which can be selectively controlled in dependence upon a predetermined value of the capacity of the converter or upon reaching a predetermined control signal for activating the drive motor control and serving as a regulating unit for the torque control.

9. Device according to claim 8, characterised in that a limit value provided for activating the drive motor control corresponds at least approximately to 100%.

10. Device according to claim 3 characterised in that the torque control device is provided with a resettable integral section for the drive motor control.

11. Device according to claim 10, characterised in that for the integral section of the drive motor control a resetting system is provided which can be activated in dependence on at least one predetermined limit value of the motor speed or of the drive output speed.

12. Device according to claim 11, characterised in that a gear-changing mechanism is provided which is connected to be driven by the hydrodynamic torque converter and which can be controlled in dependence on the output speed of the motor or of the drive, and that the resetting system of the integral section of the drive motor control can be activated in dependence on the fact that at least one predetermined switching stage of the gear-changing mechanism is switched in.

13. Device according to claim 4, characterised in that the torque control device is provided with a subordinated armature-current control system for the commutator motor and with controllable excitation as a regulating unit.

14. Device according to claim 1, characterised in that the torque control device is designed as an integral control system.

15. Device according to claim 14, characterised in that said comparator has operatively arranged thereafter an integral section the output of which is limited.

16. Device according to claim 15, characterised in that the comparator has arranged thereafter a limiter structured as a limit-value switch.

17. Device according to claim 1, characterised in that a subordinate acceleration control system is provided in which the time derivative of the drive output speed is used as an auxiliary control variable.

18. Device according to claim 17, characterised in that for the subordinate acceleration control system a further set-value/actual-value comparator is provided which is followed by an integral section the output of which is limited.

19. Device according to claim 1 characterised in that the torque control device is provided with a subordinate drive motor speed limiting system.

20. Device according to claim 19, characterised in that the drive motor speed limiting system is provided with a limit-value/actual-value comparator and an associated limit value transmitter.

21. Device according to claim 20, characterised in that a gear-changing mechanism is provided which is arranged after the drive motor and which has associated with it a switching control system and that the limit-value transmitter of the speed-limiting system is provided with a control connection to this switching control system and can be controlled in dependence on the particular gear stage selected of the gear-changing mechanism or can be switched over between at least two different limit values.

22. Device according to claim 1 characterised in that a bridging transmission which can be switched between rigid gearing and free-wheeling, is provided for the hydrodynamic torque converter.

23. Device according to claim 22, characterised in that a gear-changing mechanism is provided which is connected to be driven by the hydrodynamic torque converter, and that the switching-over of the bridging transmission to a rigid transmission ratio is coupled with at least one predetermined gear stage of the gear-changing mechanism being engaged.

24. Device according to claim 3, wherein the drive motor control is a speed control unit.

25. Device according to claim 3, wherein the drive motor control is a torque control unit.

* * * * *